US008729555B2

(12) United States Patent
Kurita

(10) Patent No.: US 8,729,555 B2
(45) Date of Patent: May 20, 2014

(54) LIQUID CRYSTAL DISPLAY DEVICE AND MANUFACTURING METHOD THEREOF

(71) Applicant: Japan Display East Inc., Mobara (JP)

(72) Inventor: Makoto Kurita, Mobara (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 13/633,148

(22) Filed: Oct. 2, 2012

(65) Prior Publication Data
US 2013/0087801 A1      Apr. 11, 2013

(30) Foreign Application Priority Data
Oct. 5, 2011    (JP) .................................. 2011-220999

(51) Int. Cl.
*H01L 29/786*    (2006.01)

(52) U.S. Cl.
USPC .................... 257/72; 204/192.1; 257/E29.273

(58) Field of Classification Search
USPC ......................................................... 257/72
See application file for complete search history.

(56) References Cited

U.S. PATENT DOCUMENTS

| 7,760,281 | B2 * | 7/2010 | Tanabe et al. .................... 349/43 |
| 2011/0175096 | A1 | 7/2011 | Gotoh et al. |
| 2011/0269266 | A1 * | 11/2011 | Yamazaki ....................... 438/104 |
| 2012/0075564 | A1 | 3/2012 | Anjo et al. |

FOREIGN PATENT DOCUMENTS

| JP | 2011-145530 | 7/2011 |
| JP | 2012-73341 | 4/2012 |

* cited by examiner

*Primary Examiner* — Telly Green
*Assistant Examiner* — Damian A Hillman
(74) *Attorney, Agent, or Firm* — Antonelli, Terry, Stout & Kraus, LLP.

(57) ABSTRACT

A break on a video signal line is prevented during patterning on the video signal line. A video signal line, a drain electrode, and a source electrode are simultaneously formed in the same layer. The video signal line includes three layers: a base layer, an AlSi layer, and a cap layer. Conventionally, an alloy having a high etching rate is formed at the boundary between the AlSi layer and the cap layer, causing breakage during patterning on the video signal line. According to the present invention, in the formation of the video signal line, the AlSi layer is formed by sputtering, a TFT is exposed to the atmosphere to form an Al oxide layer on the surface of the AlSi layer, and then the cap layer is formed by sputtering. Thus, the formation of an alloy having a high etching rate on a part of the AlSi layer is prevented, precluding the occurrence of a break on the video signal line.

12 Claims, 14 Drawing Sheets

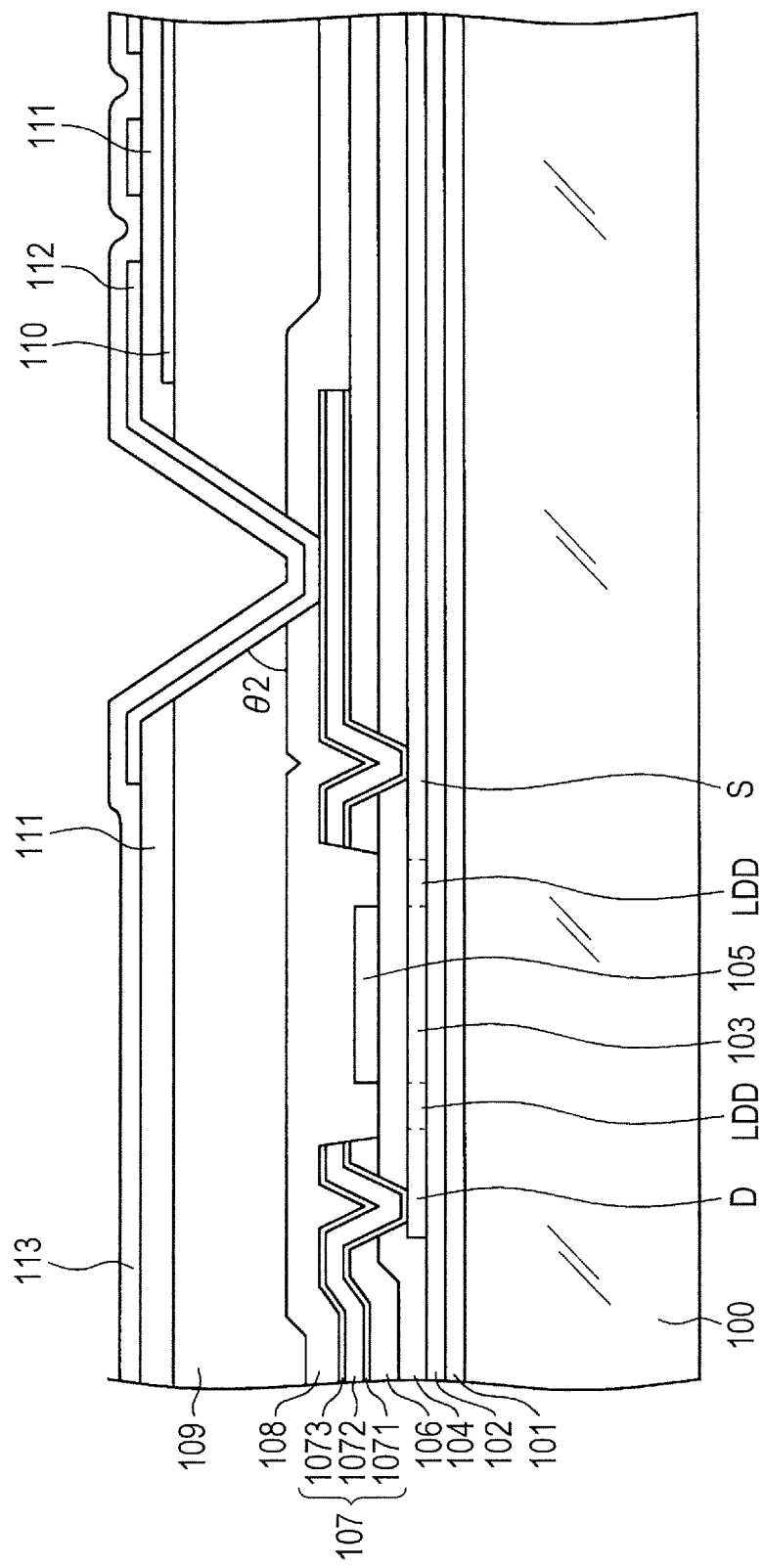

FIG. 8A

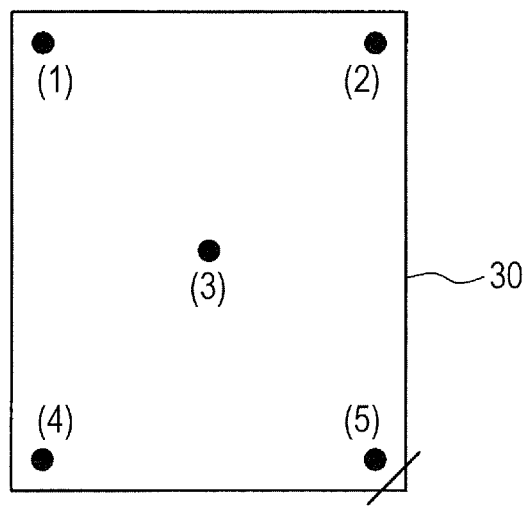

FIG. 8B

DETERMINED ADHESION EVALUATION ON CAP MoW/AlSi INTERFACE

| | EVALUATED POSITION | | | | |
|---|---|---|---|---|---|
| | (1) | (2) | (3) | (4) | (5) |
| CONTINUOUS DEPOSITION (Ref) | NO PEELING | NO PEELING | NO PEELING | NO PEELING | NO PEELING |
| DISCONTINUOUS DEPOSITION 0 h | NO PEELING | NO PEELING | NO PEELING | NO PEELING | NO PEELING |
| DISCONTINUOUS DEPOSITION 24 h | NO PEELING | NO PEELING | NO PEELING | NO PEELING | NO PEELING |
| DISCONTINUOUS DEPOSITION 96 h | NO PEELING | NO PEELING | NO PEELING | NO PEELING | NO PEELING | und
LIQUID CRYSTAL DISPLAY DEVICE AND MANUFACTURING METHOD THEREOF

CLAIM OF PRIORITY

The present application claims priority from Japanese Patent Application JP 2011-220999 filed on Oct. 5, 2011, the content of which is hereby incorporated by reference into this application.

FIELD OF THE INVENTION

The present invention relates to display devices and, in particular, to a liquid crystal display device that provides a configuration in which breakage can be prevented on video signal lines.

BACKGROUND OF THE INVENTION

A liquid crystal display device includes a TFT substrate on which pixel electrodes and thin-film transistors (TFTs) are formed in a matrix and a substrate that is opposed to the TFT substrate and has a color filer or the like located so as to face the pixel electrodes of the TFT substrate. A liquid crystal is interposed between the TFT substrate and the opposed substrate. The light transmittance of liquid crystal molecules is controlled for each pixel so as to form an image.

Liquid crystal display devices are flat and lightweight and thus have been widely used in various fields, for example, large display devices such as a television, cellular phones, and digital still cameras (DSCs). Moreover, liquid crystal display devices have disadvantageous viewing angles. In other words, an image is viewed differently depending on a viewing angle with respect to a screen. Regarding viewing angles, liquid crystal display devices of in plain switching (IPS) have excellent characteristics.

In a liquid crystal display device, video signal lines are extended in a first direction and arranged in a second direction while scanning lines are extended in the second direction and arranged in the first direction. An Al alloy is used for the video signal line to reduce the line width and electric resistance. An Al alloy is likely to become defective during etching or development in a photolithographic process.

Various IPS liquid crystal display devices are available. In some methods, video signal lines or drain electrodes and pixel electrodes of indium tin oxide (ITO) are formed on the same layer (e.g., a gate insulating film), an interlayer insulating film is formed thereon, and comb-shaped counter electrodes are formed thereon. In this case, unfortunately, a developer of ITO dissolves the video signal lines or the drain electrodes, leading to defects or breaks.

In order to solve the problem, Japanese Patent Laid-Open No. 2012-73341 describe a configuration in which ITO pixel electrodes are first formed and then the drain electrodes of TFTs or video signal lines are formed. For the same purpose, Japanese Patent Laid-Open No. 2011-145530 describes a configuration in which ITO contained in pixel electrodes forms a two-layer structure for preventing a developer of ITO from damaging drain electrodes or video signal lines.

SUMMARY OF THE INVENTION

In a liquid crystal display device, a TFT is formed for each pixel. FIG. 13 is a plan view illustrating a configuration in which video signal lines 107 are extended in a vertical direction and arranged in a horizontal direction, scanning lines 105 are extended in the horizontal direction and arranged in the vertical direction, and pixels are formed in respective regions surrounded by the video signal lines 107 and the scanning lines 105. In FIG. 13, pixel electrodes are omitted. A video signal for each of the pixels passes through a first through hole 115, three TFTs, and a second through hole 116 from the video signal line 107 and then is supplied to the pixel electrode (not shown).

In FIG. 13, the scanning line 105 acts as a gate electrode 105 of the TFT. A semiconductor layer 103 passes under the scanning line 105 (gate electrode) three times while being curved from the first through hole 115 connected to the video signal line 107, forming three top-gate TFTs.

The video signal line 107 acts as a drain electrode 107 for the TFTs. A metal layer formed in the same layer as the video signal line 107 acts as a source electrode 107. The video signal lines, the drain electrodes, and the source electrodes of the same material are simultaneously formed and thus are denoted as the same number, 107. The video signal lines 107 are composed of Al or Al alloys to reduce an electric resistance. In this case, the video signal lines 107 are made of AlSi containing about 1% of Si. Al easily diffuses onto the semiconductor layers 103 and may cause hillocks.

In order to prevent Al from diffusing onto the semiconductor layer 103, a base layer 1071 containing MoW is formed under an AlSi layer and a cap layer 1073 containing MoW is formed on an AlSi layer 1072. In an etching process during photolithography, the video signal line 107 configured thus is likely to be broken as illustrated in FIG. 13.

FIG. 14 is a cross-sectional view illustrating a broken point on the video signal line 107 of. 13. In FIG. 14, a first base film 101, a second base film 102, a gate insulating film 104, and an interlayer insulating film 106 are formed on a TFT substrate 100. Moreover, the video signal line 107 is formed on the interlayer insulating film 106. The video signal line 107 has a break 70. Furthermore, an inorganic passivation film 108 is formed on the video signal line 107, an organic passivation film 109 is formed thereon, an upper insulating film 111 is formed thereon, and an oriented film 113 is formed thereon. In FIG. 14, the inorganic passivation film 108 having an irregular shape is deposited at a broken point of the video signal line 107.

In the case where the broken video signal line 107 cannot be repaired, the liquid crystal display device is defective. The present invention prevents breakage of the video signal line 107 having a three-layer structure as illustrated in FIG. 13 or FIG. 14.

The present invention is devised to solve the problem. Specifically, the present invention has the following main configuration: a liquid crystal display device including scanning lines extended in a first direction and arranged in a second direction, video signal lines extended in the second direction and arranged in the first direction, and pixels formed in respective regions surrounded by the scanning lines and the video signal lines, wherein the pixel contains a TFT, the TFT includes a semiconductor layer, a gate insulating film, a gate electrode, a drain electrode, and a source electrode, the video signal line includes a base layer, an AlSi layer, and a cap layer, and the amount of oxygen at the boundary between the AlSi layer and the cap layer is at least 50 times larger than the amount of oxygen at the center of the AlSi layer.

A main process of a manufacturing method of the present invention is a manufacturing method of a liquid crystal display device including, on a TFT substrate, scanning lines extended in a first direction and arranged in a second direction, video signal lines extended in the second direction and arranged in the first direction, and pixels formed in respective regions surrounded by the scanning lines and the video signal lines, the video signal line including a base layer, an AlSi layer, and a cap layer, wherein after the base layer and the AlSi layer are formed by sputtering, the method includes the steps of: removing the TFT substrate from a vacuum chamber to expose the TFT substrate to the atmosphere; and sputtering the cap layer in the vacuum chamber.

The present invention can prevent breakage on a video signal line, a drain electrode, a source electrode, and so on in a patterning process, thereby increasing the manufacturing yield of a liquid crystal display device.

BRIEF DESCRIPTION OF THE DRAWINGS

FIG. 1 is a cross-sectional view illustrating a liquid crystal display device according to an embodiment of the present invention;

FIGS. 8A and 8B show adhesive strength test results on the cap layer;

DETAILED DESCRIPTION OF THE INVENTION

Figure 2A:
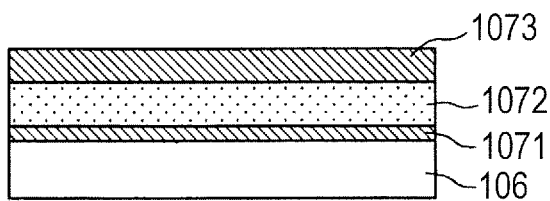
FIGS. 2A to 2D are cross-sectional views schematically illustrating a mechanism of a break according to the related art.

The contents of the present invention will be specifically described below with reference to embodiments described herein.

First Embodiment

FIG. 1 is a cross-sectional view illustrating a TFT and a pixel section in a liquid crystal display device according to an embodiment of the present invention. The TFT in FIG. 1 is a top-gate TFT having a gate electrode 105 on a channel section.

In FIG. 1, a first base film 101 made of SiN and a second base film 102 made of $SiO_2$ are formed on a glass substrate 100 by CVD. The first base film 101 and the second base film 102 prevent an impurity from the glass substrate 100 from contaminating a semiconductor layer 103.

The semiconductor layer 103 is formed on the second base film 102. The semiconductor layer 103 is a poly-Si film obtained by laser-annealing an a-Si film formed on the second base film 102 by CVD. The poly-Si film is patterned by photolithography.

A gate insulating film 104 is formed on the semiconductor layer 103. The gate insulating film 104 is a $SiO_2$ film containing tetraethoxysilane (TEOS). This film is also formed by CVD. The gate electrode 105 is formed on the gate insulating film 104. The gate electrode 105 is formed in the same layer at the same timing as a scanning line 105. The gate electrode 105 is composed of a MoW film. In the case where the scanning line 105 needs to be reduced in resistance, the gate electrode 105 contains an Al alloy.

The gate electrode 105 is patterned by photolithography. During the patterning, a poly-Si layer is doped with impurities such as phosphorus and boron by ion implantation to form a source S or a drain D on the poly-Si layer. Furthermore, a photoresist in the patterning of the gate electrode 105 is used to form a lightly doped drain (LDD) layer between the channel layer of the poly-Si layer and one of the source S and the drain D.

After that, an interlayer insulating film 106 made of $SiO_2$ is formed over the gate electrode 105 or the scanning line 105. The interlayer insulating film 106 is provided to insulate the scanning line 105, the video signal line 107, and so on. A source electrode 107 and a drain electrode 107 are formed on the interlayer insulating film 106. The source electrode 107, the drain electrode 107, and a video signal line 107 are simultaneously formed in the same layer. The video signal line 107 to be reduced in resistance contains an AlSi alloy. The content of Si is about 1% in AlSi. Since the AlSi alloy may cause hillocks or Al may diffuse onto other layers, the AlSi alloy is sandwiched between a base layer 1071 of MoW and a SD cap layer 1073. In this configuration, for example, the base layer 1071 has a thickness of 40 nm, the AlSi layer 1072 has a thickness of 250 nm, and the cap layer 1073 has a thickness of 75 nm.

A first through hole 115 is formed on the gate insulating film 104 to connect the drain of the TFT and the drain electrode 107. The drain electrode 107 is connected to the video signal line 107. Moreover, the first through hole 115 is formed on the gate insulating film 104 to connect the source S of the TFT and the source electrode 107.

An inorganic passivation film 108 covers the source electrode 107, the drain electrode 107, the video signal line 107 and so on to protect the overall TFT. The inorganic passivation film 108 is formed by CVD like the first base film 101 and is covered with an organic passivation film 109. The organic passivation film 109 is made of, for example, a photosensitive acrylic resin. The organic passivation film 109 acting as a planarizing film has a large thickness. The thickness of the organic passivation film 109 may be 1 μm to 4 μm and is actually, in many cases, 2 μm to 3 μm.

An counter electrode 110 made of indium tin oxide (ITO) is formed as a transparent electrode on the organic passivation film 109. The counter electrode 110 is a flat electrode. An upper insulating film 111 made of SiN is formed on the counter electrode 110, and a comb-shaped pixel electrode 112 is formed thereon. A second through hole 116 is formed on the upper insulating film 111, the organic passivation film 109, and the inorganic passivation film 108 to feed a video signal to the pixel electrode 112 through the TFT, thereby connecting the source electrode 107 and the pixel electrode 112. When the video signal is applied to the pixel electrode 112, a line of electric force generated between the comb-shaped pixel electrode 112 and the flat counter electrode 110 rotates liquid crystal molecules, thereby changing the transmittance of a liquid crystal layer so as to form an image.

The flat counter electrode 110 is formed on the organic passivation film 109, and the comb-shaped pixel electrode 112 is formed on the upper insulating film 111 disposed on the counter electrode 110. This configuration is called IPS-PRO. Reversely from FIG. 1, a flat pixel electrode 112 may be formed on the organic passivation film 109, and a comb-shaped counter electrode 110 is formed on the upper insulating film 111 disposed on the pixel electrode 112. This configuration is also called IPS-PRO.

Figure 13:
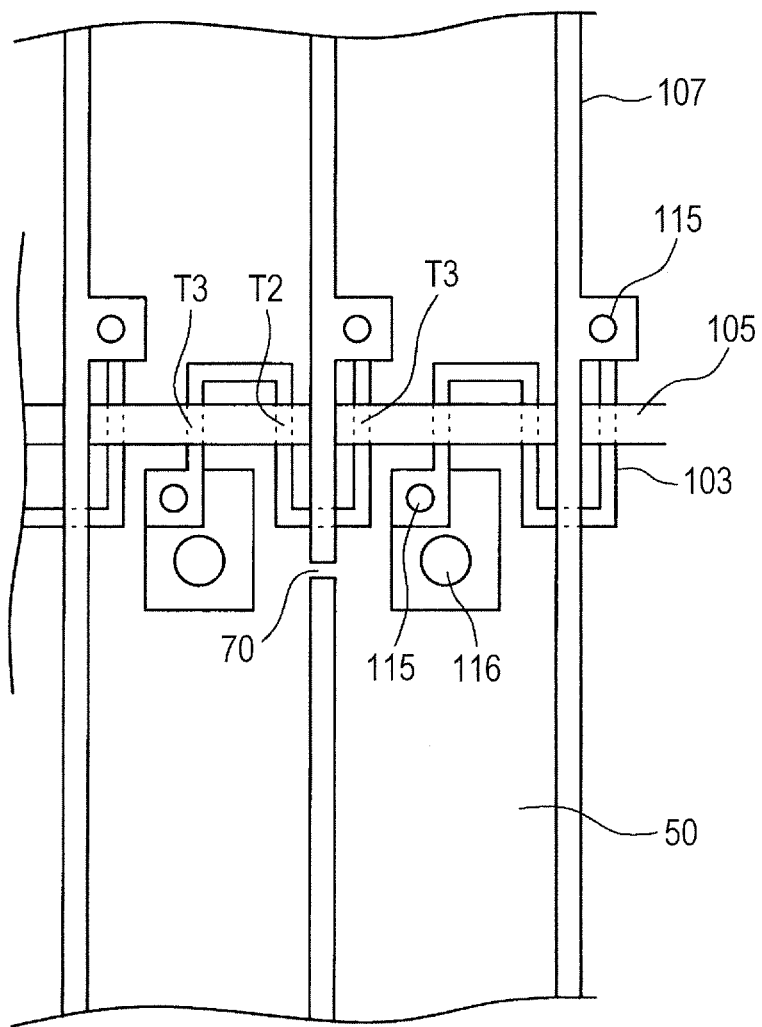
FIG. 13 is a plan view illustrating a pixel section and a TFT with a break on the video signal line according to the embodiment of the present invention.
Figure 14:
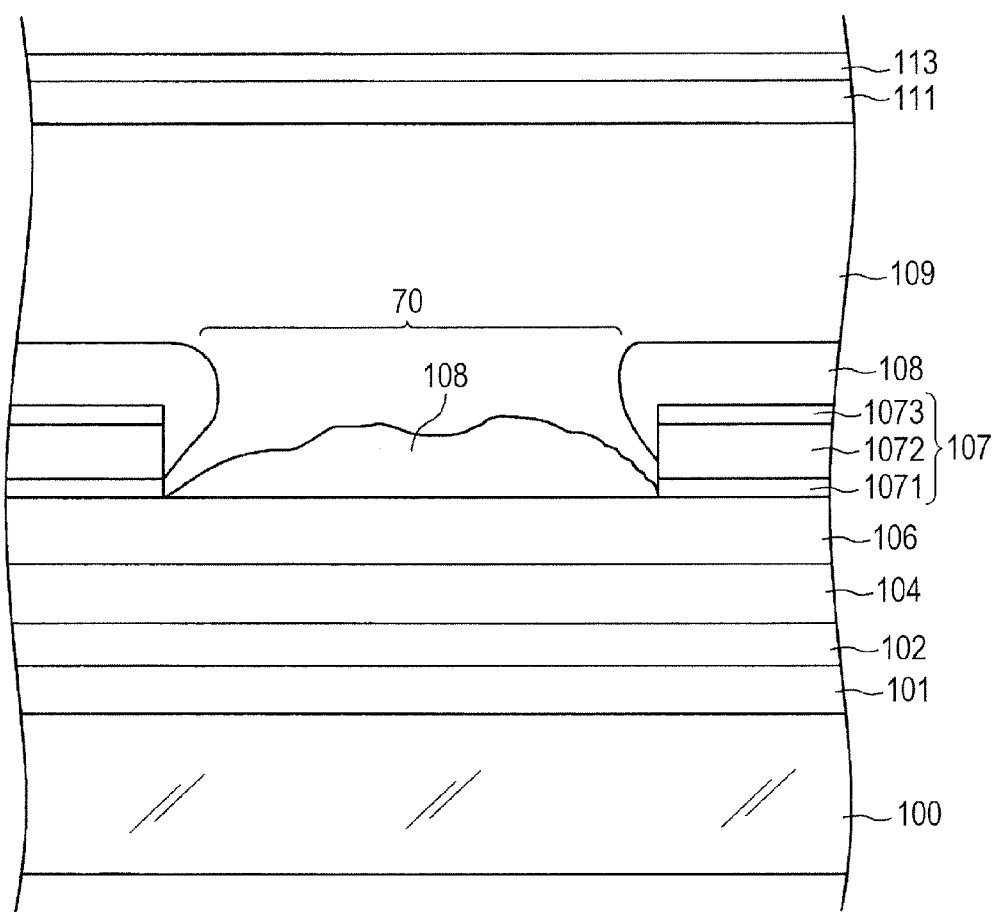
FIG. 14 is a cross-sectional view illustrating a break on the video signal line.

As illustrated in FIG. 13, the drain electrode 107 in FIG. 1 is integrated with the video signal line 107. Thus, the video signal line 107 also includes the base layer 1071, the AlSi layer 1072, and the cap layer 1073. As illustrated in FIGS. 13 and 14, the thin and long video signal line 107 is likely to be broken. The base layer 1071, the AlSi layer 1072, and the cap layer 1073 are sequentially formed by sputtering and then are patterned at the same time by photolithography.

According to an examination of the cause of breakage of the video signal line 107, the number of breaks increases with a time period during which the cap layer 1073 is deposited by sputtering and is patterned by photolithography. This is because an alloy is formed between the AlSi layer 1072 and the cap layer 1073 and is quickly etched by an etchant.

Figure 2B:
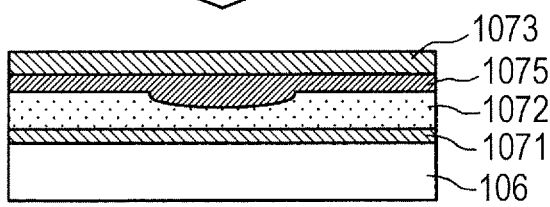
Figure 2C:
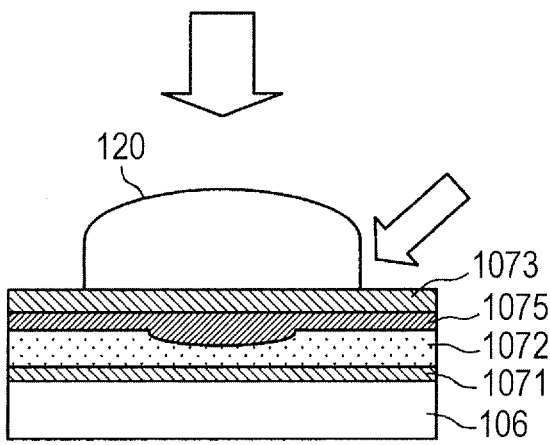
Figure 2D:
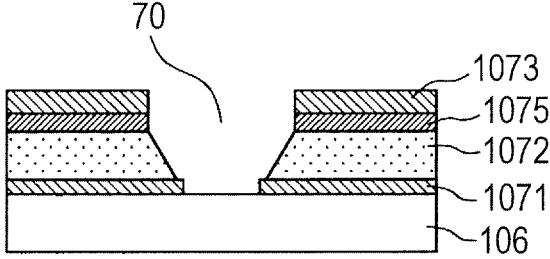

FIGS. 2A to 2D are cross-sectional views schematically illustrating the mechanism. In FIG. 2A, the video signal line 107 including the base layer 1071, the AlSi layer 1072, and the cap layer 1073 is deposited on the interlayer insulating film 106. FIG. 2B illustrates an alloy layer 1075 formed between the AlSi layer 1072 and the cap layer 1073. The alloy layer 1075 partially has a large thickness. In FIG. 2C, a resist 120 is formed for patterning and is exposed to an etchant. FIG. 2O illustrates etching proceeding at a high etching speed toward a thick portion of the alloy layer 1075, that is, in the direction of a white arrow. FIG. 2D illustrates a break 70 caused by the etchant on the thick portion of the alloy layer 1075 in the video signal line 107.

Figure 3:
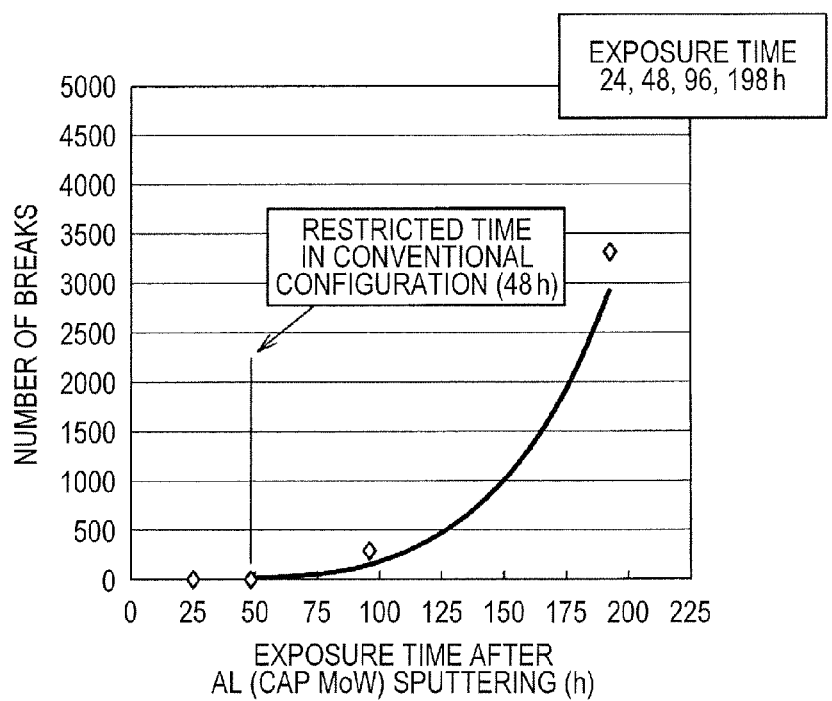
FIG. 3 is a graph showing the relationship between an exposure time and the occurrence of breaks of a video signal line after the formation of a cap layer according to the related art.

The alloy layer 1075 in, for example, FIG. 2B expands with the passage of time after the video signal line 107 is deposited by sputtering. Thus, the ratio of breakage increases with an exposure time from deposition by sputtering to photolithography. FIG. 3 is a graph of the number of breaks (number of breaks in FIG. 3) on the video signal lines 107 and an exposure time during which the cap layer 1073 is sputtered and is patterned by photolithography according to the related art, in which the alloy layer 1075 is formed as illustrated in FIGS. 2A to 2D.

In FIG. 3, on the vertical axis, the number of breaks on the video signal lines 107 is the number of breaks on the video signal lines 107 on each motherboard. Specifically, in the manufacturing of the liquid crystal display device, a large number of liquid crystal display panels are formed on a large motherboard and are separated by dicing, etc. In FIG. 3, the motherboard is 730 mm×920 mm and contains 200 liquid crystal display panels. In other words, for example, if 500 breaks occur on the video signal lines 107, the liquid crystal display panels formed on the motherboard are mostly defective.

In FIG. 3, the video signal lines 107 are hardly broken before 50 hours. Thus, in conventional specifications, a time period during which the cap layer 1073 is sputtered and is patterned by photolithography is set at 48 hours or less to prevent breakage of the video signal lines 107, which means a severely restricted process.

Figure 4:
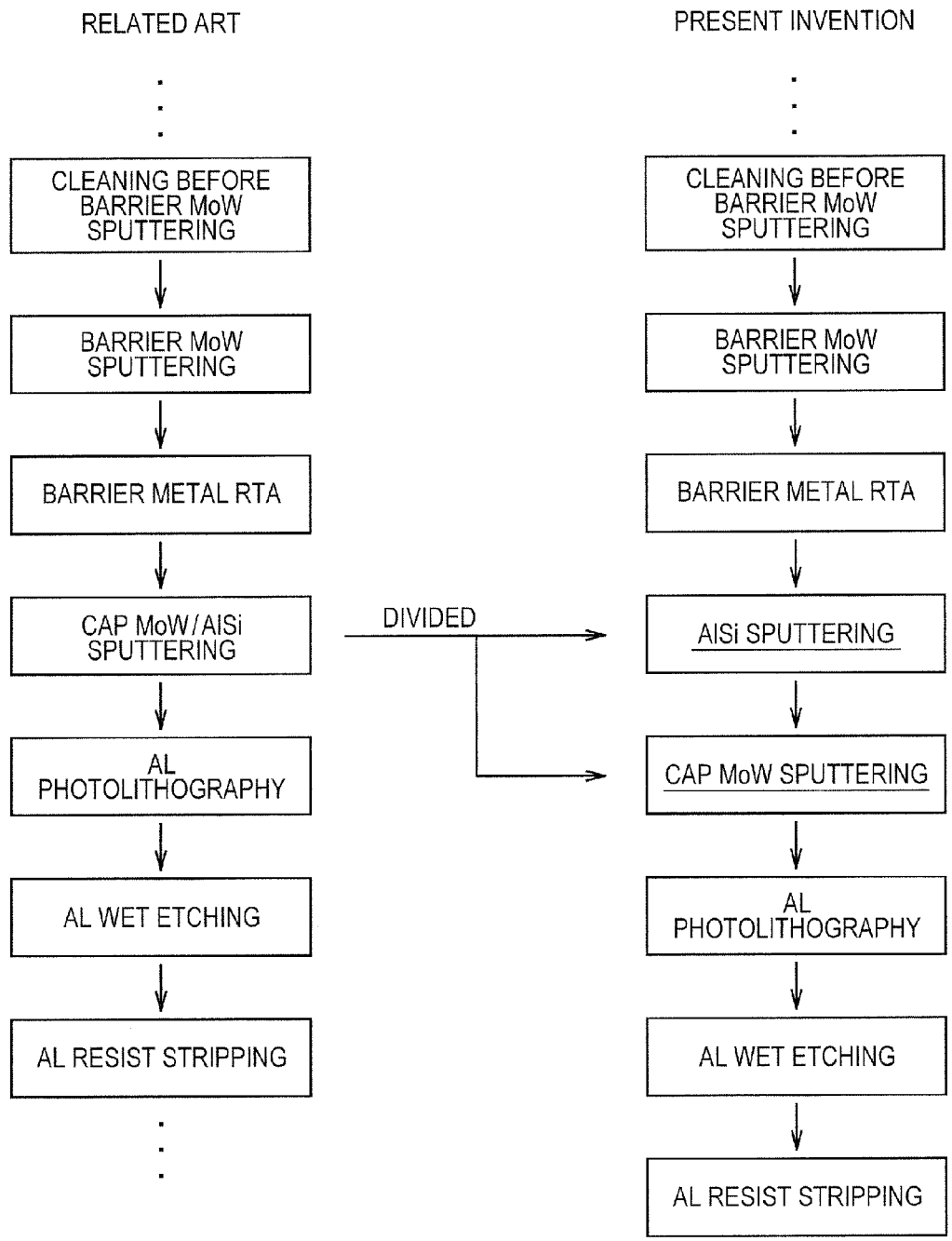
FIG. 4 shows the manufacturing process flows of the video signal line according to the related art and the embodiment of the present invention.

The present invention provides a configuration that does not break the video signal lines 107 even in the case where an exposure time increases after the cap layer 1073 is sputtered. FIG. 4 shows a manufacturing process of a liquid crystal display panel that realizes the configuration according to the embodiment of the present invention. FIG. 4 shows a comparison between the process according to the embodiment of the present invention and the process of the related art.

The related art in FIG. 4 will be first described below. On the TFT substrate 100, the interlayer insulating film 106 is formed and then is cleaned before the formation of the base layer 1071, which is cleaning before barrier MoW sputtering. After that, MoW constituting the base layer 1071 is sputtered, and then the base layer 1071 is subjected to rapid thermal anneal (RTA). RTA is a process for promptly annealing the base layer 1071 with a lamp. RTA can improve a blocking effect on Al of the base layer 1071.

After that, the AlSi layer 1072 is formed by sputtering in another sputtering chamber, and then MoW constituting the cap layer 1073 is formed by sputtering. After that, Al photolithography is performed, wet etching is simultaneously performed on the cap layer 1073, the AlSi layer 1072, and the base layer 1071, and then the resist 120 is peeled off.

In the related art, the AlSi layer 1072 and the cap layer 1073 are continuously formed and thus the alloy layer 1075 is produced between the two layers. The alloy layer 1075 has a higher etching rate than other metals, leading to breakage. According to the embodiment of the present invention, an oxide layer 1074 of Al is formed between the AlSi layer 1072 and the cap layer 1073, thereby preventing the production of the alloy layer 1075. The oxide layer 1074 of Al is considered to be mainly composed of $AL_2O_3$ because the content of Si in the AlSi layer 1072 is about 1%.

A process flow according to the embodiment of the present invention is shown on the right side of FIG. 4. The present invention is different from the related art in that the AlSi layer 1072 is formed by sputtering, the substrate is removed from a vacuum chamber, and then the AlSi layer 1072 is exposed to the atmosphere to form the Al oxide layer 1074 on the surface of the AlSi layer 1072. This configuration can prevent the formation of the alloy layer 1075 having a high etching rate between the AlSi layer 1072 and the cap layer 1073. The Al oxide layer 1074 having a low etching rate hardly causes breakage during etching.

The sputtered AlSi layer 1072 only needs to be exposed to the atmosphere for quite a short time. This is because the oxide layer 1074 is formed in an extremely short time. A time period for sufficient exposure to the atmosphere may be deliberately set at 30 seconds or longer. The oxide layer 1074 of Al does not exceed a certain thickness, not particularly requiring any upper limits except that the AlSi layer 1072 is deteriorated by moisture or the like in the atmosphere in an extended time period.

Figure 5A:
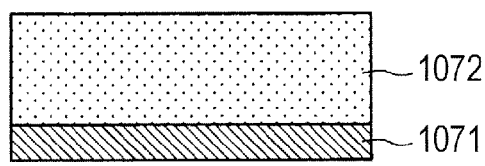
FIGS. 5A to 5F are cross-sectional views illustrating a manufacturing process of the video signal line according to the embodiment of the present invention.
Figure 5B:
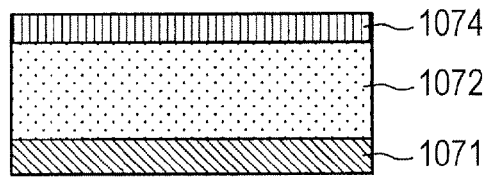
Figure 5C:
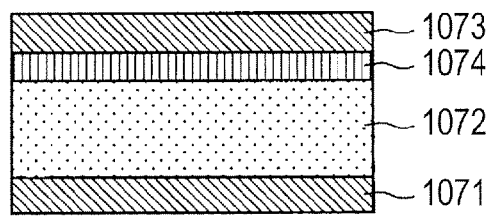

FIGS. 5A to 5F show a manufacturing flow of the video signal line 107, the drain electrode 107, the source electrode 107 (hereinafter, will be called the video signal line), and so on. In FIGS. 5A to 5F, the interlayer insulating film bearing the video signal line 107 is omitted. In FIG. 5A, the base layer 1071 of MoW and the AlSi layer 1072 are formed as in the related art. In FIG. 5B, after the AlSi layer 1072 is formed, the substrate is removed from the vacuum chamber and then is exposed to the atmosphere to form the Al oxide layer 1074 on the surface of the AlSi layer 1072. In FIG. 5C, the cap layer 1073 of MoW is formed on the Al oxide layer 1074.

Figure 5D:
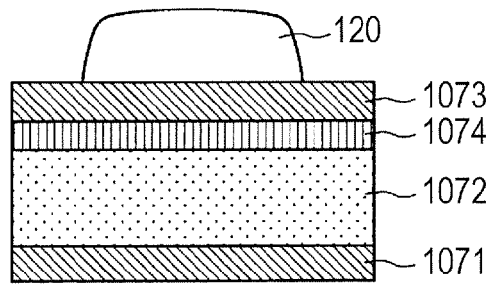
Figure 5E:
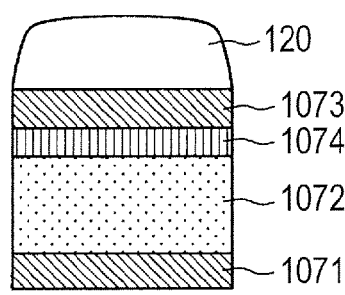
Figure 5F:
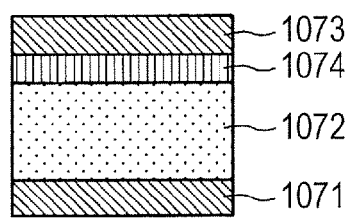

In FIG. 5D, the resist 120 is formed for patterning on the cap layer 1073. In FIG. 5E, etching is performed in this state to remove the cap layer 1073, the AlSi layer 1072, and the base layer 1071 except for a part where the resist 120 is formed. In FIG. 5F, the resist 120 is removed. As illustrated in FIGS. 5A to 5F, according to the embodiment of the present invention, the Al oxide layer 1074 is formed instead of an alloy having a high etching rate between the AlSi layer 1072 and the cap layer 1073. Thus, unlike in the related art, the break 70 can be prevented during etching on the video signal line 107.

Figure 6:
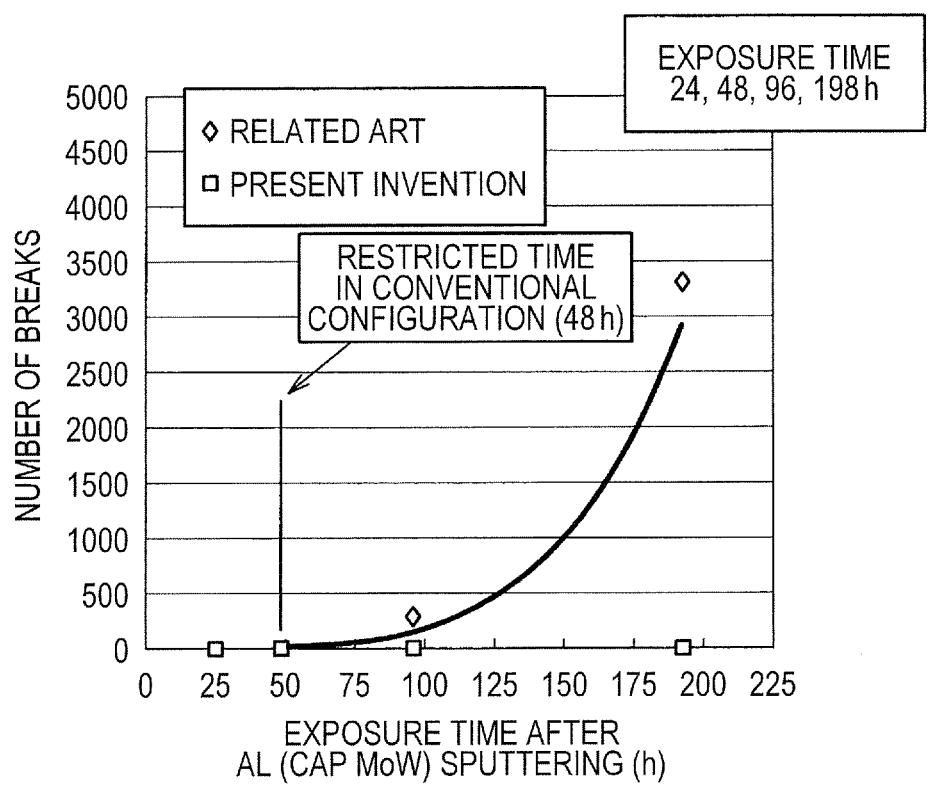
FIG. 6 is a graph showing an exposure time and the number of breaks on the video signal line after the formation of the cap layer, for comparison between the related art and the embodiment of the present invention.

FIG. 6 shows a comparison of the number of breaks on the video signal lines 107 between the related art and the embodiment of the present invention applied to an actual product. In the related art, as indicated by diamond plots, the number of breaks on the video signal lines 107 increases exponentially from 50 hours. According to the embodiment of the present invention indicated by square plots, the number of breaks on the video signal line 107 is zero in a test period of 196 hours. The number of breaks 70 on the video signal lines 107 is counted on the 730 mm×920 mm motherboard as in FIG. 3. As shown in FIG. 6, the embodiment of the present invention is quite effective in preventing breakage on the video signal lines 107.

Figure 7B:
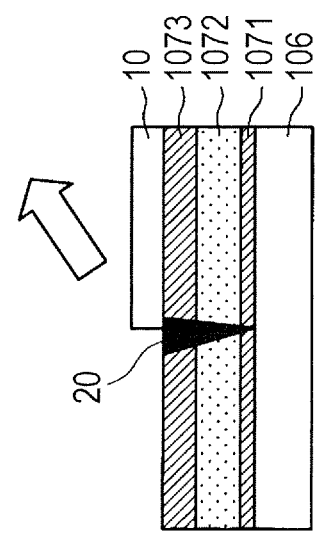
FIGS. 7A and 7B are schematic diagrams showing an adhesive strength test on the cap layer.
Figure 7A:
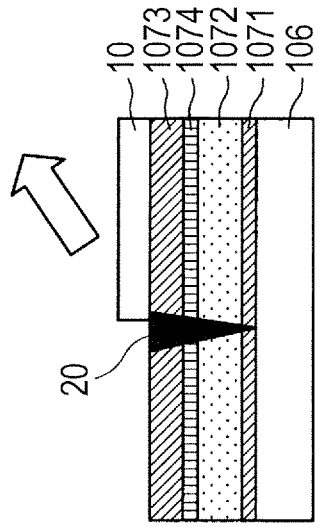

Furthermore, it is necessary to evaluate adhesion between the AlSi layer 1072 and the cap layer 1073 or variations in etching width in the formation of the Al oxide layer 1074 between the AlSi layer 1072 and the cap layer 1073. FIGS. 7A and 7B are schematic diagrams for evaluating adhesion between the AlSi layer 1072 and the cap layer 1073.

FIG. 7A illustrates the related art. In FIG. 7A, the base layer 1071, the AlSi layer 1072, and the cap layer 1073 are formed on the interlayer insulating film 106. A cut 20 is made on the cap layer 1073, the AlSi layer 1072, and the base layer 1071 by a cutter and then tape 10 is bonded to the cap layer 1073 to conduct a peeling test. FIG. 7B illustrates a configuration according to the embodiment of the present invention. In FIG. 7B, the cut 20 is made on the cap layer 1073, the Al oxide layer 1074, the AlSi layer 1072, and the base layer 1071 by a cutter and then the tape 10 is bonded to the surface of the cap layer 1073 to conduct a peeling test. In the case where the cap layer 1073 is peeled from the AlSi layer 1072 or the Al oxide layer 1074, the adhesion is found to be insufficient.

FIG. 8A illustrates peeling test spots on a motherboard 30. The test spots are located at the center and four corners of the motherboard 30. FIG. 8B shows peeling test results. Continuous deposition in the left column of FIG. 8B indicates the continuous formation of the AlSi layer 1072 and the cap layer 1073 according to the related art. Ref stands for reference.

In discontinuous deposition according to the embodiment of the present invention, the AlSi layer 1072 is sputtered, the Al oxide layer 1074 is formed on the surface of the AlSi layer 1072 so as to destroy the vacuum, and then the cap layer 1073 is formed. A time under "Discontinuous deposition" is an exposure time in the atmosphere until the cap layer 1073 is sputtered after the sputtering of the AlSi layer 1072. "0 h" indicates that the AlSi layer 1072 is exposed to the atmosphere and then is immediately returned to the vacuum chamber.

Numbers arranged in the row direction of FIG. 8B correspond to the locations in FIG. 8A. As shown in FIGS. 8A and 8B, the cap layer 1073 is not peeled off at any of the locations. In other words, the embodiment of the present invention and the related art are not significantly different from each other in the peeling of the cap layer 1073.

Figure 9:
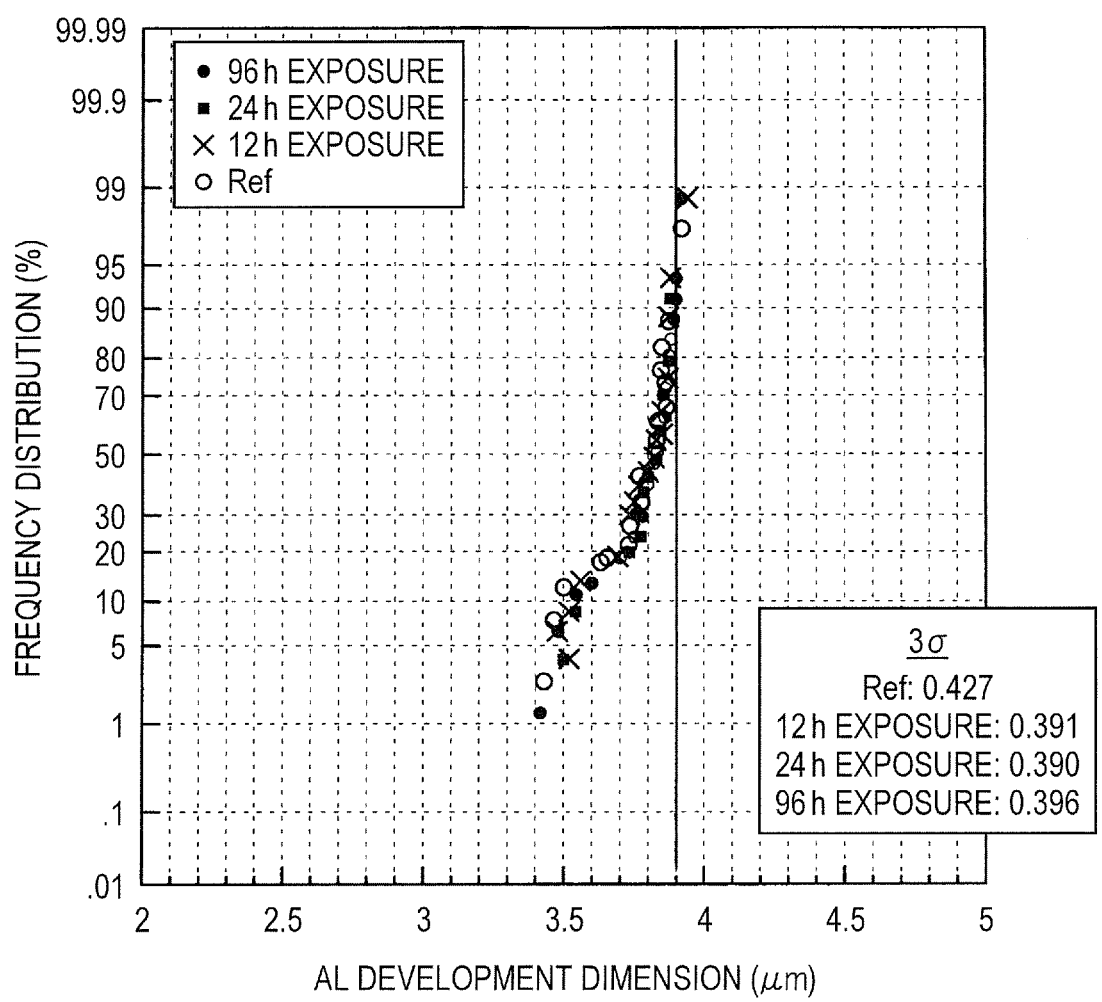
FIG. 9 shows distributions of resist development widths according to the present invention and the related art.
Figure 10:
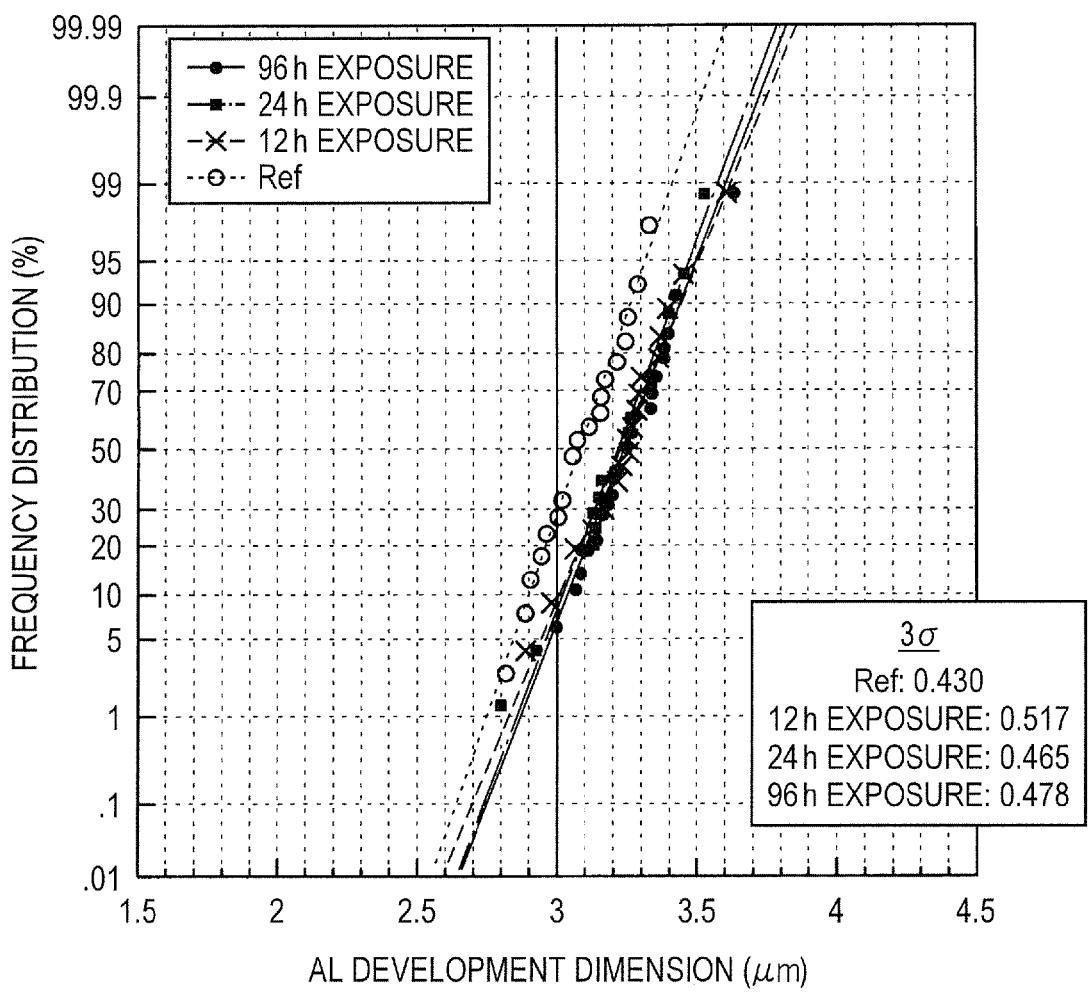
FIG. 10 shows pattern width distributions of the video signal line according to the present invention and the related art.

FIGS. 9 and 10 show evaluation examples of variations in the width of the video signal line 107 in the configuration according to the embodiment of the present invention. The cap layer 1073 is formed by sputtering and then the resist 120 is formed in a photo step. The widths of resist (the development dimensions of the resist) are compared between the related art and the embodiment of the present invention. In FIG. 9, the horizontal axis represents the development dimensions of the resist 120 on the video signal line 107 and the vertical axis represents a frequency distribution. Ref indicates the related art in which the cap layer 1073 is formed by sputtering so as to be connected to the AlSi layer 1072. In FIG. 9, 12 h exposure, 24 h exposure, and 96 h exposure indicate the time periods of exposure of the substrate to the atmosphere until the formation of the cap layer 1073 after the formation of the AlSi layer 1072 according to the embodiment of the present invention.

As shown in FIG. 9, the related art and the embodiment of the present invention are not significantly different from each other in the development dimensions of the resist 120 at the exposure times of 12 h, 24 h, and 96 h. In FIG. 9, 3σ for Ref is 0.427 which is slightly large, whereas in the embodiment of the present invention, 3σ is 0.391 in 12 h exposure, 0.390 in 24 h exposure, and 0.396 in 96 h exposure. Although 3τ in the embodiment of the present invention is slightly smaller than that of the related art, such a difference is deemed to be within the range of variations of production lots.

FIG. 10 shows the distribution of the widths of the video signal line 107 after etching. In FIG. 10, the horizontal axis represents the dimensions of completed Al, that is, the dimensions of the video signal line 107 while the vertical axis represents a frequency distribution. An evaluation target in FIG. 10 is the same as in FIG. 9. In FIG. 10, the dimensions of the video signal line 107 according to the embodiment of the present invention are larger than those of the related art. This is because the Al oxide layer 1074 having a low etching rate is formed between the AlSi layer 1072 and the cap layer 1073 according to the embodiment of the present invention.

According to the embodiment of the present invention, the formed AlSi layer 1072 is exposed to the atmosphere for 12 h, 24 h, and 96 h until the cap layer 1073 is formed, making no significant differences. In related art (Ref), 3σ is 0.43. 3σ is 0.517 in 12 h exposure, 0.465 in 24 h exposure, and 0.478 in 96 h exposure. Such a difference is within the range of variations of production lots.

The video signal line 107 in the configuration according to the embodiment of the present invention is larger in width than in the configuration of the related art but the variations are found to be unchanged. Thus, the development dimensions of the resist 120 are determined in consideration of a difference in etching rate, allowing the video signal line to have a predetermined width with variations similar to those of the related art.

Figure 11:
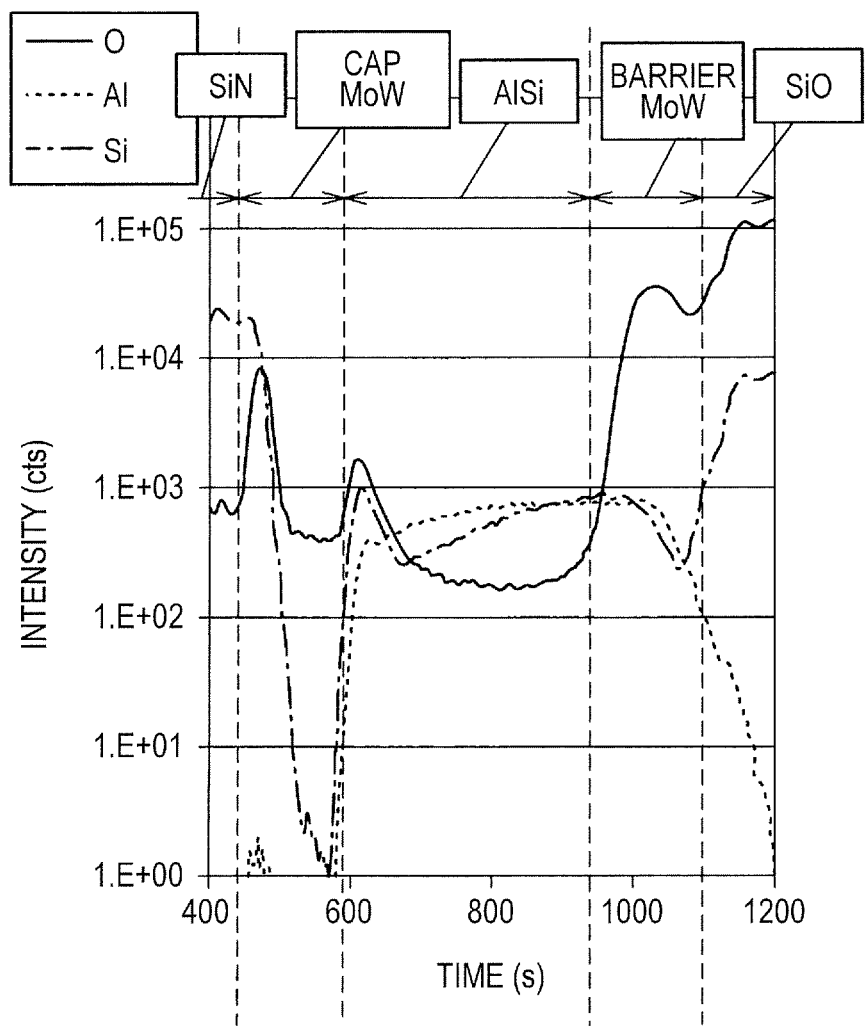
FIG. 11 shows element analysis results of SIMS on the video signal line according to the related art.

FIG. 11 shows data of secondary ion mass spectrometry (SIMS) for specifying the components of the video signal line 107 and the upper and lower layers of the video signal line 107 according to the conventional specifications. SIMS is measured from the components of the upper side of the layer. In FIG. 11, first, SiN of the inorganic passivation film 108 is observed, MoW of the cap layer 1073 is detected, the AlSi layer 1072 is detected, MoW of the base layer 1071 is detected, and then $SiO_2$ of the interlayer insulating film 106 is detected. In FIG. 11, a solid line represents oxygen, a dotted line represents Al, and a chain line represents Si.

Figure 12:
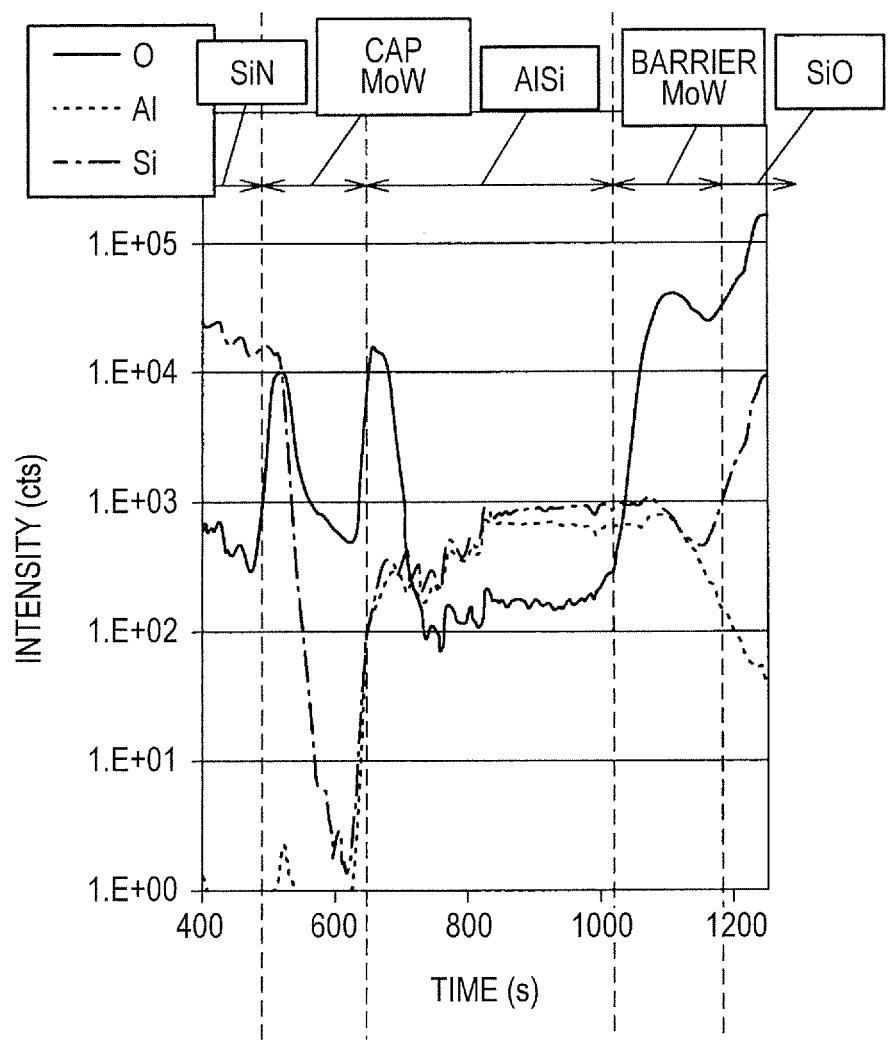
FIG. 12 shows element analysis results of SIMS on the video signal line according to the embodiment of the present invention.

FIG. 12 shows SIMS data for specifying the components of the video signal line 107 and the upper and lower layers according to the embodiment of the present invention. In FIG. 12, first, SiN of the inorganic passivation film 108 is observed, MoW of the cap layer 1073 is detected, and then the AlSi layer 1072 is detected. FIG. 12 is considerably different from FIG. 11 of the related art in that quite a large amount of oxygen is retained at the boundary between the AlSi layer 1072 and the cap layer 1073. The amount of oxygen decreases toward the center of the AlSi layer 1072 as in the related art. After that, MoW of the base layer 1071 is detected and then $SiO_2$ of the interlayer insulating film 106 is detected as in the related art in FIG. 11.

A feature of the embodiment of the present invention is that the amount of oxygen at the boundary between the AlSi layer 1072 and the cap layer 1073 in FIG. 12 is at least 50 times, more preferably, at least 100 times larger than the amount of oxygen at the center of the AlSi layer 1072. In FIG. 11 showing the related art, the amount of oxygen at the boundary between the AlSi layer 1072 and the cap layer 1073 is about 10 times larger than the amount of oxygen at the center of the AlSi layer 1072.

As has been discussed, according to the embodiment of the present invention, the Al oxide layer 1074 is formed at the boundary between the AlSi layer 1072 and the cap layer 1073, thereby preventing a break on a part having an extremely high etching rate during patterning on the video signal line or the like. Thus, the production yield of the liquid crystal panel can be improved.

The IPS-PRO configuration has been described which uses the top-gate TFTs according to the embodiment of the present invention. The present invention is similarly applicable to IPS-PRO in which so-called bottom-gate TFTs have gate electrodes placed under a semiconductor layer. The present invention is further applicable to a liquid crystal display device called IPS-LITE in which a flat pixel electrode is formed on an inorganic passivation film and a comb-shaped counter electrode is formed on an interlayer insulating film as described in Japanese Patent Application No. 2010-217062 or Japanese Patent Laid-Open No. 2011-145530. The present invention is also applicable to so-called twisted nematic (TN) or vertical alignment (VA) liquid crystal display devices. In other words, the present invention is applicable to a liquid crystal display device in which one of a video signal line, a drain electrode, and a source electrode includes three layers: a base layer, an AlSi layer, and a cap layer.

What is claimed is:

1. A liquid crystal display device comprising:
    scanning lines extended in a first direction and arranged in a second direction;
    video signal lines extended in the second direction and arranged in the first direction; and
    pixels formed in respective regions surrounded by the scanning lines and the video signal lines,
    wherein the pixel contains a TFT,
    the TFT includes a semiconductor layer, a gate insulating film, a gate electrode, a drain electrode, and a source electrode,
    the video signal line includes a base layer, an AlSi layer, and a cap layer, and an amount of oxygen at a boundary between the AlSi layer and the cap layer is at least 50 times larger than an amount of oxygen at a center of the AlSi layer.

2. The liquid crystal display device according to claim 1, wherein the amount of oxygen at the boundary between the AlSi layer and the cap layer is at least 100 times larger than the amount of oxygen at the center of the AlSi layer.

3. The liquid crystal display device according to claim 1, wherein the TFT is a top-gate TFT.

4. A manufacturing method of a liquid crystal display device including, on a TFT substrate, scanning lines extended in a first direction and arranged in a second direction, video signal lines extended in the second direction and arranged in the first direction, and pixels formed in respective regions surrounded by the scanning lines and the video signal lines, the video signal line including a base layer, an AlSi layer, and a cap layer, wherein after the base layer and the AlSi layer are formed by sputtering, the method comprises the steps of:
    removing the TFT substrate from a vacuum chamber to expose the TFT substrate to an atmosphere; returning the TFT substrate to the vacuum chamber after the exposure to the atmosphere; and sputtering the cap layer in the vacuum chamber; wherein the video signal line is configured so that an amount of oxygen at a boundary between the AlSi layer and the cap layer is at least 50 times lamer than an amount of oxygen at a center of the AlSi layer.

5. The manufacturing method of a liquid crystal display device according to claim 4, wherein after the base layer and the AlSi layer are formed by sputtering, the TFT substrate removed from the vacuum chamber is exposed to the atmosphere for at least 30 seconds.

6. The manufacturing method of a liquid crystal display device according to claim 4, wherein after the base layer is formed by sputtering, the TFT substrate is removed from the vacuum chamber and is exposed to the atmosphere, and then the AlSi layer is formed in the vacuum chamber by sputtering.

7. The liquid crystal display device according to claim 1, wherein the video signal line further includes an Al oxide layer at the boundary between the AlSi layer and the cap layer.

8. The liquid crystal display device according to claim 1, wherein the video signal line with the amount of oxygen at the boundary between the AlSi layer and the cap layer of at least 50 times larger than the amount of oxygen at the center of the AlSi layer is configured so as to substantially prevent breakage of the video signal line.

9. The liquid crystal display device according to claim 1, wherein the video signal line is configured without an alloy layer having a high etching rate between the AlSi layer and the cap layer.

10. The manufacturing method of a liquid crystal display device according to claim 4 wherein the video signal line further includes an Al oxide layer at the boundary between the AlSi layer and the cap layer.

11. The manufacturing method of a liquid crystal display device according to claim 4 wherein the video signal line with the amount of oxygen at the boundary between the AlSi layer and the cap layer of at least 50 times larger than the amount of oxygen at the center of the AlSi layer is configured so as to substantially prevent breakage of the video signal line.

12. The manufacturing method of a liquid crystal display device according to claim 4 wherein the video signal line is configured without an alloy layer having a high etching rate between the AlSi layer and the cap layer.

* * * * *